United States Patent
Bays et al.

(10) Patent No.: US 10,496,095 B1
(45) Date of Patent: Dec. 3, 2019

(54) AUTONOMOUS AGENT SCHEDULING

(71) Applicant: United States of America as Represented by the Secretary of the Navy, Arlington, VA (US)

(72) Inventors: Matthew J. Bays, Panama City, FL (US); Thomas A. Wettergren, Panama City, FL (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 107 days.

(21) Appl. No.: 15/806,131

(22) Filed: Nov. 7, 2017

(51) Int. Cl.
| | |
|---|---|
| *G05D 1/00* | (2006.01) |
| *B64C 39/02* | (2006.01) |
| *B63G 8/00* | (2006.01) |
| *G06Q 10/06* | (2012.01) |
| *G05D 1/10* | (2006.01) |
| *G06Q 50/30* | (2012.01) |

(52) U.S. Cl.
CPC ........... *G05D 1/0088* (2013.01); *B63G 8/001* (2013.01); *B64C 39/024* (2013.01); *G05D 1/104* (2013.01); *G06Q 10/06316* (2013.01); *G06Q 50/30* (2013.01); *B63G 2008/004* (2013.01); *B63G 2008/005* (2013.01); *B64C 2201/126* (2013.01)

(58) Field of Classification Search
USPC .......................................................... 701/2
See application file for complete search history.

(56) References Cited

U.S. PATENT DOCUMENTS

| | | | | |
|---|---|---|---|---|
| 7,236,861 B2* | 6/2007 | Paradis | ................... | F41H 13/00 701/120 |
| 7,451,023 B2* | 11/2008 | Appleby | .............. | G05D 1/0088 701/120 |
| 7,765,038 B2* | 7/2010 | Appleby | ................. | F41H 13/00 180/167 |
| 8,914,182 B2* | 12/2014 | Casado | ................ | G05D 1/0088 701/24 |
| 8,935,035 B1* | 1/2015 | Bogdanowicz | .......... | G08G 1/20 701/26 |
| 9,286,032 B2* | 3/2016 | Feblowitz | ................. | G06F 8/20 |
| 2007/0288101 A1* | 12/2007 | Liu | ....................... | G05B 13/024 700/19 |
| 2009/0045290 A1* | 2/2009 | Small | .................... | B64C 39/024 244/135 A |

(Continued)

*Primary Examiner* — Tyler D Paige
(74) *Attorney, Agent, or Firm* — James T. Shepherd (57) ABSTRACT

Methods are provided to obtain task allocation, planning, and scheduling necessary to ensure service agents can accomplish their tasks efficiently, while transport agents perform the necessary transport and refueling operations. The methods take a scheduling-centric approach, formally incorporate fuel constraints, and are generalized for an arbitrary number of service agents and transport agents. The methods provide for the formal definition of the novel simple agent transport problem, the unique modeling and constraint-based logic required for the docking, transport, and deployment of service agents and the resulting analysis. Tasks to be completed consist of a set of locations, and the agents must service each location set. The methods and systems incorporate Bayes risk to schedule slips and to the application of service agent-transport agent scheduling.

21 Claims, 7 Drawing Sheets

(56) References Cited

U.S. PATENT DOCUMENTS

| | | | |
|---|---|---|---|
| 2009/0073034 A1* | 3/2009 | Lin | G01S 19/49 342/357.32 |
| 2009/0099987 A1* | 4/2009 | Tambe | G06F 15/16 706/14 |
| 2010/0076737 A1* | 3/2010 | Boddy | G05B 17/02 703/6 |
| 2012/0123668 A1* | 5/2012 | Spinelli | G05D 1/104 701/120 |
| 2012/0245834 A1* | 9/2012 | Klooster | G08G 5/0034 701/120 |
| 2013/0231855 A1* | 9/2013 | Mcaree | E02F 9/2033 701/301 |
| 2014/0074339 A1* | 3/2014 | Casado | G05D 1/0088 701/24 |
| 2016/0068268 A1* | 3/2016 | Bookless | G06Q 10/20 701/3 |
| 2017/0285664 A1* | 10/2017 | Wang | B64C 39/024 |
| 2018/0188747 A1* | 7/2018 | Venturelli | G08G 5/0069 |
| 2018/0224854 A1* | 8/2018 | Mullan | G05D 1/104 |
| 2019/0049957 A1* | 2/2019 | Healey | G05D 1/0066 |

* cited by examiner

AUTONOMOUS AGENT SCHEDULING

STATEMENT OF GOVERNMENT INTEREST

The invention described herein may be manufactured and used by or for the Government of the United States of America for governmental purposes without the payment of any royalties.

BACKGROUND OF THE INVENTION (1) Field of the Invention

The present invention relates to scheduling of autonomous agents. More particularly, the present invention relates to scheduling and route planning operations for transport agents and service agents.

(2) Description of the Prior Art

The use of autonomous systems to perform increasingly complex and coordinated tasks has necessitated creating heterogeneous teams of agents, where different agent types specialize in different parts of an operation. One such heterogeneous team operation includes a mobile agent, or service agent, tasked with performing the direct servicing tasks for the operation. A larger, faster-moving, or longer-range agent, referred to herein as a transport agent, is responsible for transporting the service agents between jobs for faster completion.

Within manned systems, there are numerous examples of the transport agent/service agent concept such as aircraft carriers and their respective aircraft, garbage trucks and accompanying garbage workers, or mail delivery vehicles and their respective postmen. While this form of close interaction between unmanned systems is still far from common, the underlying hardware and guidance infrastructure to allow autonomous docking and deployment between unmanned systems are being researched for a variety of different applications.

Just as important as the fundamental infrastructure of docking and deploying unmanned systems autonomously is determining the most efficient schedule for when and where to perform these actions when multiple agents can be assigned to perform an operation. Indeed, new methods of package delivery such as cooperative teams of aerial drones and shipping trucks are being explored by leading technology companies. Furthermore, cooperative teams of unmanned underwater vehicles (UUVs) and unmanned surface vessels (USVs) are quickly emerging where one unit performs the substantive survey operations while the other is used for transportation and refueling.

The problem of scheduling and task allocation has been extensively studied with a variety of techniques in multiple forms. As an example, a coordination architecture for modeling multi-robot coordination and task allocation has been developed. However, this methodology limits the types of scenarios under which a constraint optimization framework can be used. The methodology is inadequate for problems where there are strongly coupled constraints on agents such as transportation actions.

Frameworks to explore optimal vehicle routing with cross-schedule constraints with applications to robotic assistance have also been investigated. However, the principal element of optimization is an agent route, not the collection of agent actions comprising the route. Additionally, in considering the route optimization problem, individuals being transported along the routes are static in such frameworks. There is no mechanism within the optimization framework for the individuals themselves to move about the area. As such, these frameworks are similar to the traditional vehicle routing problem.

Other examples of prior work in these areas have addressed the problem of finding the shortest route for paired agents. In one, the pairing consisted of an unmanned ground vehicle and an unmanned aerial vehicle (UAV) pair to transit and make deliveries to locations only reachable by the UAV. In another, the pairing involved an aircraft carrier and an aerial vehicle. However, both these works focused primarily on the overall path planning for the two vehicles, and not on fuel limitations and the higher-level scheduling aspects required when there is an arbitrary number of each vehicle type.

Other research in this area has developed a centralized algorithm to efficiently schedule manufacturing processes using robotic teams. However, the work is primarily focused on the development of a novel task sequencing heuristic that allows a simple temporal problem, coupled with simple spatial-temporal constraints, to be tractable for large numbers of tasks and robots to be assigned to a fixed set of tasks. The algorithm schedules deterministic problems, but does not handle scheduling uncertainty for the agents, where the agents may choose from a number of different docking, deployment, and movement actions to allow a location to be serviced. Also, cross-schedule constraints between the chosen actions and the transport agents are not addressed.

General robust scheduling techniques have been studied using a variety of methods. Complimentary approaches to formally incorporate uncertainty in scheduling problems have been developed. For example, formal methodologies have been developed for converting mixed-integer linear programming (MILP) scheduling problems, where model parameters are uncertain under either a bound or known probability distribution, into another MILP or mixed-integer non-linear programming (MINLP) type problem, where the uncertainty is explicitly incorporated into the optimization framework. These types of methodologies can yield a robust solution that still meets the problem constraints with a fixed probability.

In a similar manner, others have created methods to adjust the conservatism of robust MILP solutions while keeping the robust problem linear. Further work on robust scheduling and integer programming problems in the general sense can also be found. However, there appears to be no current work for explicitly incorporating Bayes risk to schedule slips, or for the application of service agent-transport agent scheduling.

Thus, a need has been recognized in the state of the art to develop agent scheduling methods which can operate when there are strongly coupled constraints on agents. The method needs to consider the collection of agent actions comprising the route and not just an agent route. Additionally, there needs to be a mechanism within the optimization framework for the individuals themselves to move about the area.

Further, the method needs to consider fuel limitations and the higher-level scheduling aspects required when there is an arbitrary number of each vehicle type. The method need to handle scheduling uncertainty for the agents and the agents need to be able to choose from a number of different docking, deployment, and movement actions to allow a location to be serviced. Also, the method needs to consider cross-schedule constraints between the chosen actions and the transport agents.

SUMMARY OF THE INVENTION

It is therefore a general purpose and primary object of the present invention to provide methods and systems to obtain the necessary task allocation, planning, and scheduling necessary to ensure service agents such as drones and UUVs can accomplish their tasks safely and efficiently, while transport agents perform the necessary transport and refueling operations. The methods and systems take a scheduling-centric approach, formally incorporate fuel constraints, and are generalized for an arbitrary number of service agents and transport agents.

The methods and systems provide for the formal definition of the novel simple agent transport problem, the unique modeling and constraint-based logic required for the docking, transport, and deployment of service agents throughout the environment and the resulting analysis. Tasks to be completed consist of a set of locations, and the agents must service each location set. The methods and systems explicitly incorporate Bayes risk to schedule slips and to the application of service agent-transport agent scheduling.

A formal mathematical framework, referred to herein as the service agent transport problem (SATP), is provided for planning a schedule of service agent and transport agent actions. Within the SATP, autonomous service agents must perform tasks at a number of locations. The agents are free to move between locations. However, the agents may also be transported throughout the region by limited number of faster-moving transport agents. The SATP results in all locations being serviced in the shortest amount of time.

There is a strong coupling between vehicle constraints, as well as between the task allocation component of the problem and the scheduling component of the problem. By strong cross-schedule constraints, it is meant that the schedule of individual agent actions, such as docking and deployment, are highly dependent on the location and schedule of multiple agents. In order for a service agent to dock with a transport agent, both agents must be located at the same position and must be untasked for a certain segment of time.

A solution to the problem is presented using a mixed-integer linear programming (MILP) optimization framework. Additionally, the methods and systems include accounting for relative uncertainty in the duration of planned tasks in such a manner as to balance the risk of schedule slips (conflicts) to the risk of creating an overly conservative and sub-optimal schedule.

Further, the framework is extended to handle uncertainty in task duration by determining optimal buffer times between tasks such that a cost function inspired by Bayes risk is minimized. The result is both a formal analysis of the high-level planning algorithms necessary for service agent and transport agent teams such as aerial drones and delivery trucks or UUVs and USVs, as well as an initial computational framework for solving the problem using a combination of MILP and complexity reduction heuristics.

In one embodiment, a method of optimizing task planning for a plurality of service agents and transport agents operating in a plurality of service areas is provided. The method includes formulating the task planning as a sequence of service agent and transport agent tasks and start times during a plurality of phases. The formulation is such that all areas are serviced, fuel limitations are observed during all phases and all service agents are docked with a transport agent at the end of the last phase. The task planning is optimized such that the end time of the last phase over all agents is minimized.

The method includes constraining docking and deployment actions of the agents, constraining fuel availability, fuel costs and fuel capacity of the agents, constraining goals and capabilities of the agents, constraining time dependency and wait times of the agents, constraining transit and transport actions of the agents and constraining servicing actions of the agents. Mixed-integer linear programming (MILP) techniques are employed to determine a task plan minimizing the end time based on the hereinabove described formulation and constraints.

Constraining the time dependency and wait times of the agents can include constraining an initial start time of a task to a scheduled start time of the task or an end time of a previous task. The end time of a previous task is taken as a start time of the previous task plus the duration of the previous task.

A start time of the next phase is constrained to being at least as great as the end time plus a buffer time. A schedule slip cost is defined as being incurred when the end time exceeds the duration of the task plus the buffer time. A delay cost is defined as being incurred when the end time is less than the duration of the task plus the buffer time.

The buffer time for each task is optimized so as to minimize the schedule slip cost or delay cost of each task. The time difference between an end time of a phase and the start time of the next phase is constrained to be at least the optimized buffer time for the phase. A robust start time is constrained to include the start time plus a summation of each buffer time. The end time of a phase is defined to include the robust start time of the phase plus the duration of a task performed by an agent at one of the service areas.

Docking and deployment actions of a pair of service and transport agents are constrained to occur at the same time for each agent. A service agent is constrained from being in a wait state at a certain location when the service agent is otherwise tasked, is waiting at a location other than the certain location, or the agent has performed an action at a different location than the certain location.

Constraining docking and deployment actions can include constraining service agents to completing certain of the tasks when the service agents are docked or deployed. Also, the service agents are constrained to being docked prior to being deployed and are tracked as to whether they are docked or deployed. Further, the number of service agents docked at a given time by a transport agent is constrained. Constraining goals and capabilities can include constraining each agent to prosecuting a single goal during one phase and constraining the scheduling of agents for completion of a task to those agents capable of completing the task.

Constraining transit and transport actions can include constraining the transit of an agent from a first location to a next location to only those agents having performed an action at the first location. Also, movements of agents between service areas and the servicing of a service area by an agent are constrained to only those agents deployed. Further, agents to be docked with agents capable of capturing the agents are constrained to only those agents previously located at the capturing location. In addition, deployment of agents is constrained to only those agents previously located at the deployment location.

Constraining servicing actions of the agents can include constraining a servicing action at a service area to when the servicing action is scheduled after a deployment action at a node within the service area, or a move action to the service area. The performance of a servicing action is constrained to when the service action is scheduled while an agent performing the service action is deployed. Each agent is constrained to prosecuting only one goal during a phase. Only agents capable of completing a task can be scheduled for the task and each goal is completed by the agent scheduled to complete the task.

In one embodiment, the search space required by MILP techniques is limited by reducing candidate dock, deploy and transit nodes of the service area to a set of closest nodes providing one node per each service area. A subset of nodes is selected to minimize a distance traveled to visit each node in the subset and a dock and deploy point to each service area is provided. The problem encapsulates a generalized traveling salesman problem (GTSP), such that the known techniques can be used in solving the GTSP before the main schedule optimization. This results in the elimination of orders of magnitude more permutations required in the overall optimization than required to solve the GTSP.

In one embodiment, the search space required by MILP techniques is limited by eliminating transition edges between nodes of said service areas within a same service area. The elimination of transition edges includes eliminating intra-service area edges.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE INVENTION

Figure 1:
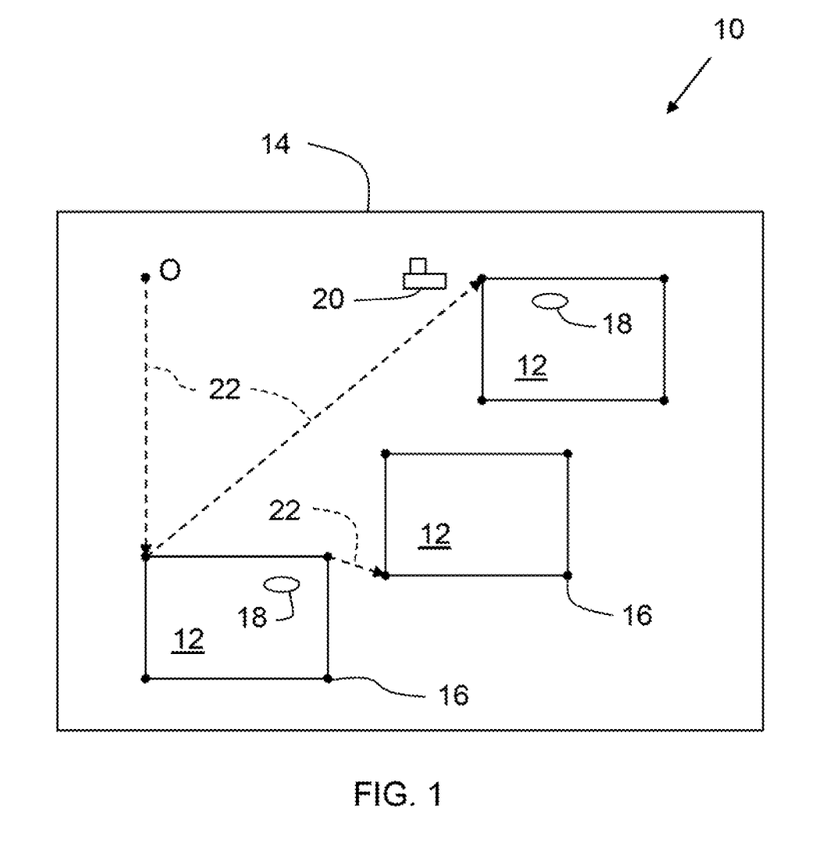
FIG. 1 is a notational illustration of the Service Agent Transport Problem (SATP)

Referring now to FIG. 1, there is shown a notational illustration 10 of the Service Agent Transport Problem (SATP). Let there exist a set of autonomous agents $\mathcal{A} = \{1, \ldots, A\}$ that are tasked with servicing a number of service areas (12) $\mathcal{S} = \{1, \ldots, S\}$. The service areas 12 are connected by a directed graph $(\mathcal{L}, \varepsilon)$ (14). The nodes $\mathcal{L} = \{0, 1, \ldots D\}$ represent locations at which an agent may enter a service area (12) $s \in \mathcal{S}$ in order to perform operations. (Each service area 12 includes four nodes 16, only two of which are designated in FIG. 1.)

The node labeled O is the origin node, which represents the starting point for all valid paths in the graph. The agents may move from node i to node j along an edge of the graph $e=(i,j) \in \varepsilon$. The subset $\mathcal{L}_S$ and $\mathcal{L}$ represents nodes from which agents may service area s.

The agents are separated into two mutually exclusive and collectively exhaustive subsets $\mathcal{A}_S$ and $\mathcal{A}_T$ consisting of service agents (18) and transport agents (20), respectively. A service agent (18) $m \in \mathcal{A}_S$ is capable of directly servicing the service areas 12, while a transport agent (20) $n \in \mathcal{A}_T$ may collect a fixed number of the service agents (18) and transport them between nodes (16). (Transport and move actions are indicated by dashed arrows 22 in FIG. 1.).

Service agents 18 may move between nodes 16 with a time cost $c_{ij}^{move}$. However, they are significantly slower than transport agents 20 with transportation cost of $c_{ij}^{trans} \leq c_{ij}^{move}$. Transport agents 20 also require a fixed amount of time to collect and deploy service agents 18. The collection and deployment costs are denoted $c^{dock}$ and $c^{deploy}$, respectively. Agents 18 and 20 initially start at an origin node O, with each transport agent 20 containing a fixed number of service agents 18 such that all service agents 18 start docked with a transport agent 20.

The model described herein is a phase-based model in that every agent may perform a single task during a phase of the mission, with phases labeled $\mathcal{P} = \{1, \ldots, P\}$. Each agent-phase pair can have a varying time length that is dependent on the particular agent and action scheduled to be performed during the phase. During a phase, an agent may perform at most one task from the set of tasks $\mathcal{K} = \{move, service, dock, deploy\}$. When service agents perform a move action, they only move themselves, while transport agents may simultaneously move up to a specified number of service agents currently docked with the transport agent.

Figure 2:
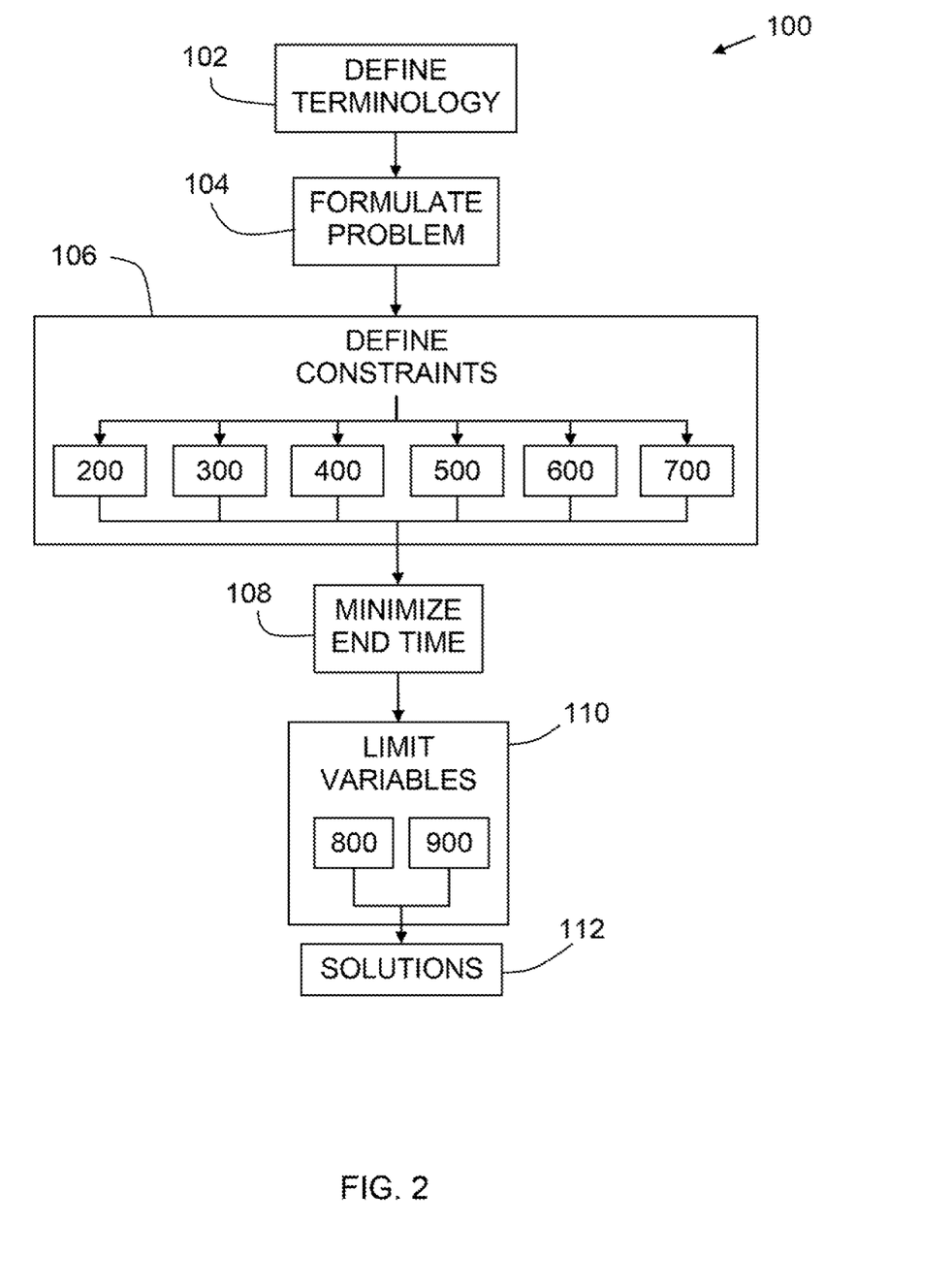
FIG. 2 illustrates a schematic block diagram of a method for task planning of the SATP.

Referring now to FIG. 2, there is shown a block diagram of method 100 for service agent-transport agent task planning. Method 100 begins by defining the terminology needed to fully describe the components of the SATP (block 102), as provided hereinbefore in relation to FIG. 1. Given the above terminology, the phase-based optimization problem can be formulated (block 104) as follows: Find a sequence of service agent and transport agent tasks $\mathcal{I}$ and start times $T^{start}$ during phases $1, \ldots, P$ such that all areas $\mathcal{S}$ are serviced, fuel limitations are observed during each phase, and all service agents are docked with a transport agent at the end of phase P such that the end time of the last phase over all agents, $\max_{a \in \mathcal{A}} T_{a,P}^{end}$, is minimized.

The primary optimization variables for the specific solution to the SATP described herein are referred to as decision variables. The decision variables fall into two groups: scheduling indicator variables and time variables. The scheduling indicator variable $I_{a,p,l}^k \in \{0,1\}$ denotes that task type k is scheduled for completion by agent a during phase p at location $l \in L_k$, where $L_k$ is the set of all feasible locations required for execution of task type k and $\cup_{k \in K} L_K = L$. The timing variables $T_{a,p}^{start} \in \mathbb{R}$ and $T_{a,p}^{end} \in \mathbb{R}$ denote the times at which the task of agent a during phase p is scheduled to start and end, respectively.

In contrast to the decision variables, additional variables are needed for the optimization problem in order to develop the necessary constraints to formulate the optimization problem. While the additional variables, which are denoted as helper variables, are technically variables used in the optimization, they are not truly independent variables in a problem formulation sense. Instead, they are constrained optimization variables used to create formal constraints. Helper variables will be further discussed as the details of the optimization problem are formulated hereinafter.

As is known to those of skill in the art, constraints need to be defined (block 106) for the mathematical formulation of the SATP. Block 106 indicates the various types of constraints to be defined hereinafter. These include, but are not necessarily limited to, docking and deployment constraints (block 200), fuel limitation and charging constraints (block 300), goal and capability constraints (block 400), time dependency and wait constraints (block 500), transit and transport constraints (block 600) and servicing constraints (block 700).

Figure 3:
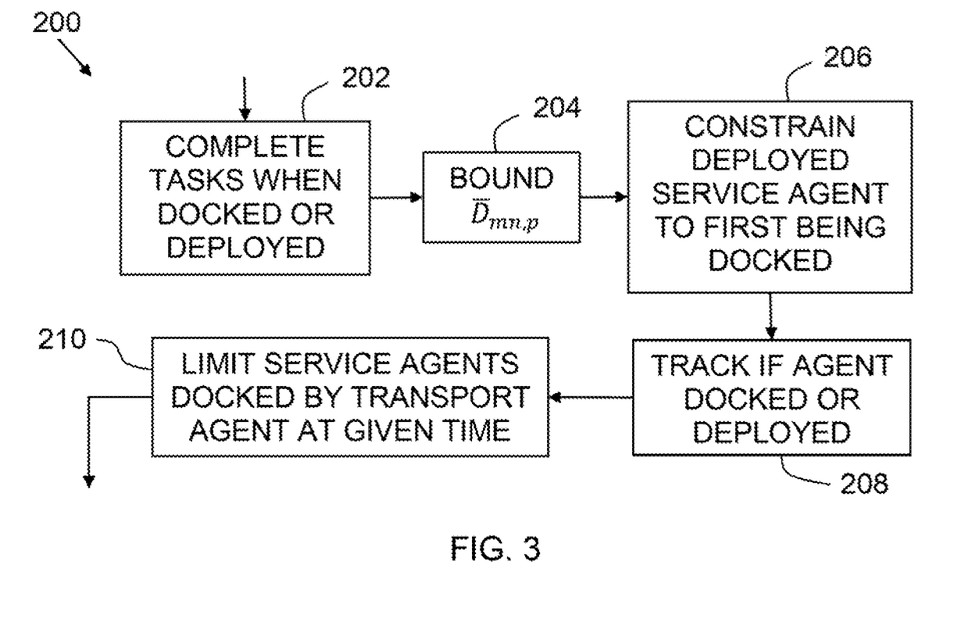
FIG. 3 illustrates a schematic block diagram of a method for defining service agent docking and deployment constraints.

Referring now to FIG. 3, there is shown a block diagram of method 200 for defining service agent docking and deployment constraints. A first constraint provides that a service agent must only complete certain tasks when they are docked or deployed, as appropriate (block 202). For enforcing this constraint, helper variables are created to track whether a service agent m is docked or deployed from a transport agent n, denoted as:

$$\overline{D}_{mn,p} = \begin{cases} 1 & \text{Agent } m \text{ is docked with agent } n \text{ in phase } p \\ 0 & \text{Otherwise} \end{cases} \quad (1)$$

Within an integer programming framework, equation (1) can be created with the formal constraint $$\forall m \in A_S, \forall n \in A_T, \forall p \in P \quad (2)$$

$$\overline{D}_{mn,p} = \sum_{p' \leq p, d \in D} \left[ I^{dock}_{mn,p',d} - I^{deploy}_{mn,p',d} \right],$$

where $I^{dock}_{mn,p',d}$ and $I^{deploy}_{mn,p',d}$ are docking and deploying indicator variables, respectively, at particular dock/deploy nodes d. $\overline{D}_{mn,p}$ is bound with the constraint $$\forall m \in A_S, \forall n \in A_T, \forall p \in P \ 0 \leq \overline{D}_{mn,p} \leq 1. \quad (3)$$

Constraints (2) and (3) now cause $\overline{D}_{mn,p}$ to equal 1 if agent m is currently docked with agent n during phase p, and 0 otherwise (block 204). Constraint (2) and the lower bound in (3) satisfy the additional requirement that in order for a service agent to be deployed, it must first have been docked (block 206). It is also necessary to track if an agent is docked or deployed in general (block 208). This is performed using the helper variable $\overline{D}_{mn,p}$ and constraints $$\forall m \in A_S, \forall p \in P \ \overline{D}_{m,p} = \Sigma_{n \in A_T} \overline{D}_{mn,p} \quad (4)$$

and $$\forall m \in A_S, \forall p \in P \ 0 \leq \overline{D}_{m,p} \leq 1. \quad (5)$$

Additionally, the total number of service agents that can be docked at a given time by a transport agent (block 210) is limited to $D_{max}$ using the constraint $$\forall n \in A_T, \forall p \in P \ \Sigma_{m \in A_S} \overline{D}_{mn,p} \leq D_{max} \quad (6)$$

With constraints (4)-(6), the feasible actions of the individual agents when deployed or docked as appropriate can be limited.

Figure 4:
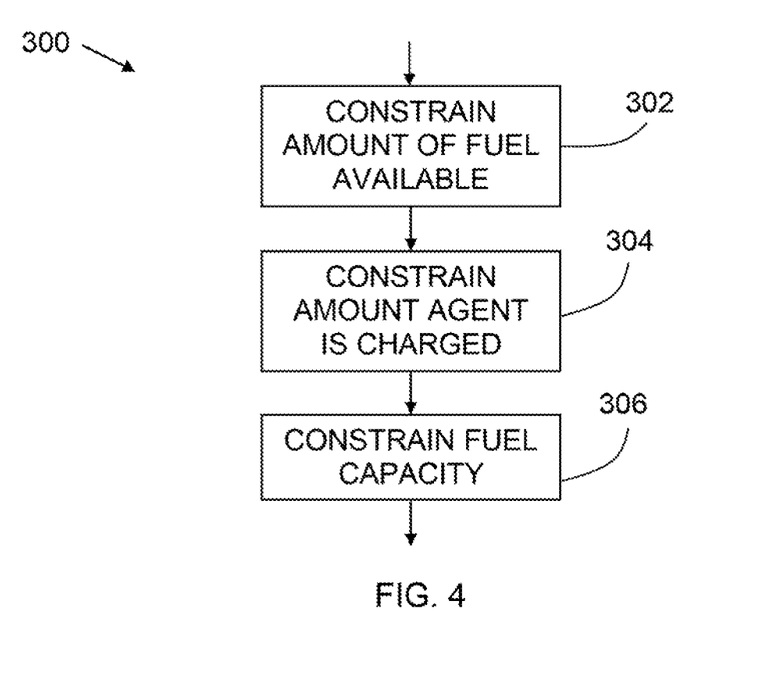
FIG. 4 illustrates a schematic block diagram of a method for defining fuel limitation and charging constraints.

Referring now to FIG. 4, there is shown a block diagram of method 300 for defining fuel limitation and charging constraints. Fuel consumption is an additional variable that must be tracked for each agent during all phases of the mission. For tracking fuel, the variable $\overline{F}_{m,p} \in \mathbb{R}$ is defined as the amount of fuel service agent m has available during the start of phase P. The variable $\overline{F}_{m,p}$ is assigned a value (block 302) using the constraints $$\forall m \in A_S, \forall p \in P \quad (7)$$

$$\overline{F}_{m,p} = \sum_{p' \leq p} \left[ \overline{F}^{charge}_{m,p'} - \sum_{s \in S} f^{service}_{m,s} I^{service}_{m,p',s} - \sum_{d \in D} \left( f^{dock}_{m,d} I^{dock}_{m,p',d} + f^{deploy}_{m,d} I^{deploy}_{m,p',d} \right) - \sum_{v \in \varepsilon} f^{move}_{m,v} I^{move}_{m,p',v} \right]$$

where $f^{service}_{m,s}$, $f^{dock}_{m,d}$, $f^{deploy}_{m,d}$ and $f^{move}_{m,v}$ are fixed costs for executing their respective goals, and $\overline{F}^{charge}_{m,p}$ is a floating variable indicating the amount an agent is charged during a phase. At block 304, the variable $\overline{F}^{charge}_{m,p}$ is fixed to its value using the linear service agent charge rate $c_m^{charge}$ and the constraints $$\forall m \in A_S, \forall p \in P \ \overline{D}_{m,p} = 1 \Rightarrow \overline{F}^{charge}_{m,p} \leq c_m^{charge}(T^{end}_{m,p} - T^{start}_{m,p}) \ \overline{D}_{m,p} = 0 \Rightarrow \overline{F}^{charge}_{m,p} = 0. \quad (8)$$

Additionally, the fuel capacity is limited (block 306) with the constraints $$\forall m \in A_S, \forall p \in P \ \overline{F}_{m,p} \leq F_{max} \quad (9)$$

$$\forall m \in A_S, \forall p \in P \ 0 < \overline{F}_{m,p}. \quad (10)$$

Figure 5:
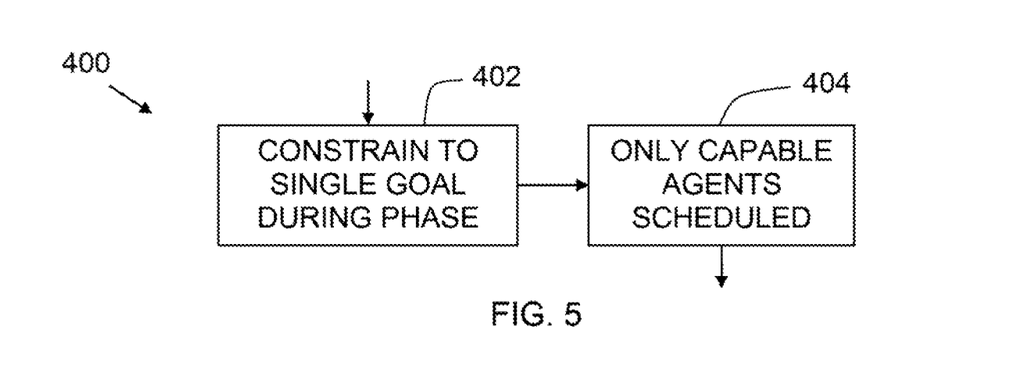
FIG. 5 illustrates a schematic block diagram of a method for defining goal and capability constraints.

Referring now to FIG. 5, there is shown a block diagram of method 400 for defining goal and capability constraints. Each agent can only prosecute one goal during a phase of the mission. As such, block 402 provides the constraint $$\forall a \in A, \forall p \in P \ \Sigma_{k \in K} \Sigma_{l \in L_k} I^k_{a,p,l} \leq 1. \quad (11)$$

As not every agent is capable of completing every task, this requires additional constraints to force only agents capable of completing a task to be scheduled for the task. As such, block 404 provides the constraint $$\forall a \notin A_k, \forall p \in P, \forall l \in L_k \ I^k_{a,p,l} = 0 \quad (12)$$

It is noted that this constraint may also be implemented for tractability by limiting both the scheduling variables $I^k_{a,p,l}$ and constraints specific to a certain capability that are created in the optimization problem to those allowed by the individual agent's capabilities.

Figure 6:
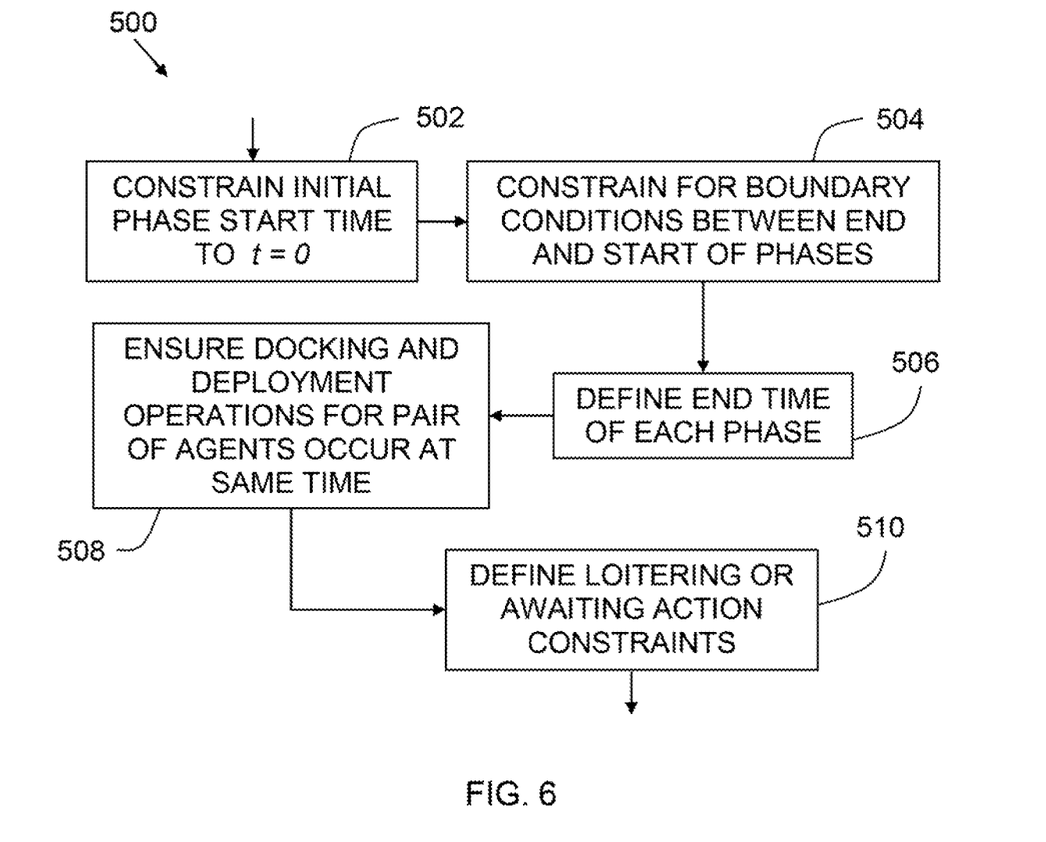
FIG. 6 illustrates a schematic block diagram of a method for defining time dependency and wait constraints.

Referring now to FIG. 6, there is shown a block diagram of method 500 for defining time dependency and wait constraints. These constraints are required for determining the specific times at which phases are scheduled for starting and ending. Without loss of generality and without limitation, the start time of the initial phase is taken at t=0. As such, block 502 provides the constraint $$\forall a \notin A \ T^{start}_{a,p=0} = 0 \quad (13)$$

In order to adhere to the boundary conditions between the end of the last phase and the start of the next phase, block 504 provides the constraint $$\forall a \notin A, \forall p \in P | p \neq 0 \ T^{start}_{a,p+1} \geq T^{end}_{a,p}. \quad (14)$$

With constraints (13) and (14), all variables have been defined, with the exception of the end time of each phase, $T^{end}_{a,p}$. The end time may be defined (block 506) by taking advantage of (11) with only one task being scheduled for an agent during a phase $$\forall a \in A, \forall p \in P \ T^{end}_{a,p} = T^{start}_{a,p} + \Sigma_{k \in K} \Sigma_{l \in L_k} c^k_{a,l} I^k_{a,p,l}, \quad (15)$$

where $c^k_{a,l}$ is the duration of task k if performed by agent a on location set L. Additionally, the dual relationship between a service agent and transport agent performing docking and deployment constraints necessitates ensuring those particular operations occur at the same time for both agents. Thus, block 508 provides time dependency constraints $$\forall m \in A_S, \forall m \in A_T, \forall p \in P \; \Sigma_{d \in D} \overline{I}_{mn,p,d}^{dock}=1 \Rightarrow \overline{T}_{m,p}^{start}= \overline{T}_{n,p}^{start} \quad (16)$$

$$\forall m \in A_S, \forall m \in A_T, \forall p \in P \; \Sigma_{d \in D} \overline{I}_{mn,p,d}^{depploy}=1 \Rightarrow \overline{T}_{m,p}^{end}=\overline{T}_{n,p}^{end} \quad (17)$$

Some scheduling situations necessitate an agent loitering or otherwise performing no meaningful actions during a given phase so that it may properly coordinate with the actions of other agents. For example, a transport agent may need to wait at a docking point during a phase in which a service agent is servicing an area with which it will dock in the proceeding phase. In this case, an additional variable is required indicating that an agent is idle during that phase at a given location. This indicator variable, $\overline{I}_{a,p,d}^{wait}$, can be defined (block 510) by the constraints $$\forall a \in A, \forall p \in P, \forall d \in D \; \Sigma_{k \in K}[\Sigma_{l \in L_k} \overline{I}_{a,p,l}^{k}] + \Sigma_{d' \in D|d' \neq d} \overline{I}_{a,p,d'}^{wait}=1 \Rightarrow \overline{I}_{a,p,d}^{wait}=0 \quad (18)$$

$$\forall a \in A, \forall k \in K, \forall p \in P, \forall d \in D \; \Sigma_{k \in K}[\Sigma_{l \in L_k|d \in L} \overline{I}_{a,p-1,l}^{k}] + \Sigma_{d' \in D|d' \neq d} \overline{I}_{a,p-1,d'}^{wait}=1 \Rightarrow \overline{I}_{a,p,d}^{wait}=0 \quad (19)$$

$$\forall a \in A, \forall p \in P \; \Sigma_{k \in K} \Sigma_{l \in L_k} \overline{I}_{a,p,l}^{k}=0 \Rightarrow \Sigma_{d \in D} \overline{I}_{a,p,d}^{wait}=1 \quad (20)$$

Constraint (18) forces $\overline{I}_{a,p,d}^{wait}$ to equal zero if the agent is otherwise tasked or waiting at another location. Constraint (19) forces $\overline{I}_{a,p,d}^{wait}$ to equal zero if the agent performed an action at a different location d' during the previous time step, thereby prohibiting the agent from waiting at location d. Constraint (20) forces $\overline{I}_{a,p,d}^{wait}$ to one if the agent is not otherwise tasked.

Figure 7:
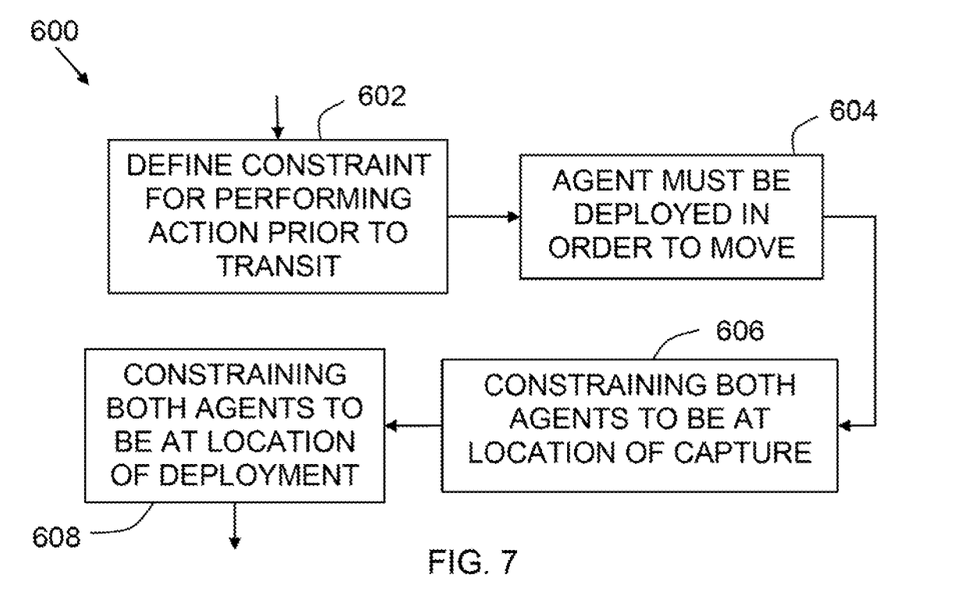
FIG. 7 illustrates a schematic block diagram of a method for defining transit and transport constraints.

Referring now to FIG. 7, there is shown a block diagram of method 600 for defining transit and transport constraints required for transiting agents and transporting them. In order for an agent to transit from one location to the next, it must have performed an action at the previous location $$\forall m \in A_S, \forall p \in P, \quad (21)$$
$$\forall d_0 \in D \sum_{d \in D} \overline{I}_{m,p,(d_0,d)}^{move} = 1 \Rightarrow \sum_{d' \in D} \overline{I}_{m,p-1,(d',d_0)}^{move} + \sum_{n \in A_T} \overline{I}_{mn,p-1,d_0}^{deploy} + \sum_{s \in S|d_0 \in D_S} \overline{I}_{m,p-1,s}^{service} + \overline{I}_{m,p-1,d}^{wait} = 1$$

where $(d_0,d),(d',d_0) \in \varepsilon$ (block 602). Additionally, we have the constraint (block 604) that for an agent to either move from one area to the next or to service an area, the agent must be deployed $$\forall m \in A_S, \forall p \in P \; \sum_{v \in \varepsilon} \overline{I}_{m,p,v}^{move} = 1 \Rightarrow \overline{D}_{m,p} = 0 \quad (22)$$

For an agent m to be docked with another agent n capable of capturing agents, both agents must have been located previously at the location of the capture. Thus, block 606 provides $$\forall m \in A_S, \forall n \in A_T, \forall p \in P, \forall d \in D \quad (23)$$

$$\overline{I}_{mn,p,d}^{dock}=1 \Rightarrow \sum_{d_0 \in D} \overline{I}_{m,p-1,(d_0,d)}^{move} + \overline{I}_{m,p-1,d}^{wait} + \sum_{s \in S|d \in D_S} \overline{I}_{m,p-1,s}^{service} = 1$$

$$\overline{I}_{mn,p,d}^{dock} = 1 \Rightarrow \sum_{d_{0_1} \in D} \overline{I}_{n,p-1,(d_{0_1},d)}^{move} + \overline{I}_{n,p-1,d}^{wait} + \sum_{m' \in A_S|m' \neq m} \left[ \overline{I}_{m'n,p-1,d}^{dock} + \overline{I}_{m'n,p-1,d}^{deploy} \right] \geq 1 \quad (24)$$

where $(d_{0_1},d),(d_{0_2},d) \in \varepsilon$. Likewise, there is the constraint for deploying agents (block 608)

$$\forall m \in A_S, \forall n \in A_T, \forall p \in P, \forall d \in D \; \overline{I}_{mn,p,d}^{deploy}=1 \Rightarrow \overline{D}_{mn,p}=1 \quad (25)$$

$$\overline{I}_{mn,p,d}^{deploy} = 1 \Rightarrow \sum_{d_{0_1} \in D} \overline{I}_{n,p-1,(d_{0_1},d)}^{move} + \overline{I}_{n,p-1,d}^{wait} + \sum_{m' \in A_S|m' \neq m} \left[ \overline{I}_{m'n,p-1,d}^{dock} + \overline{I}_{m'n,p-1,d}^{deploy} \right] \geq 1 \quad (26)$$

Figure 8:
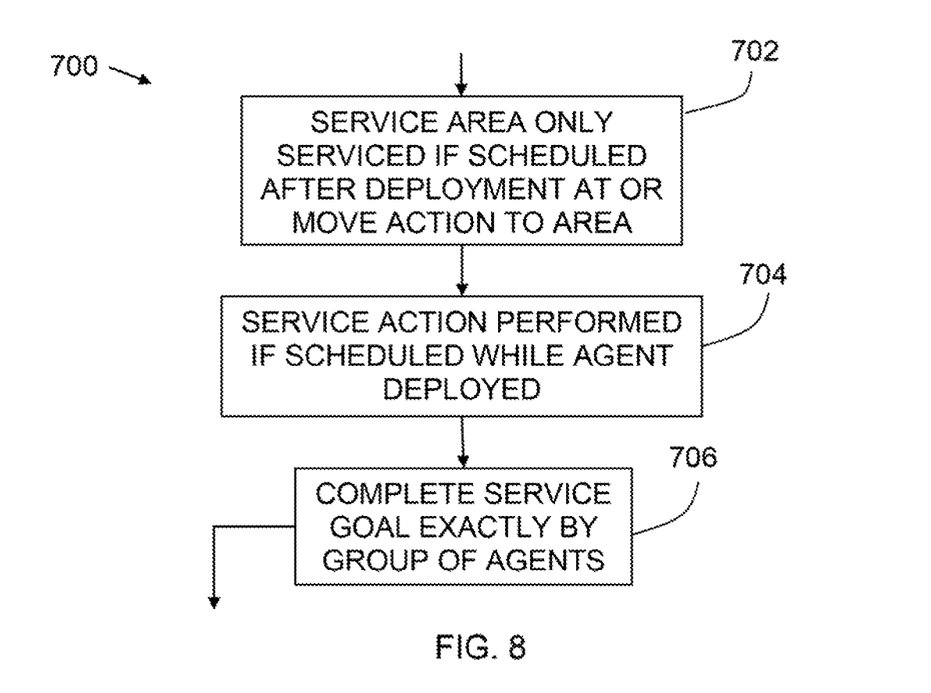
FIG. 8 illustrates a schematic block diagram of a method for defining servicing constraints.

Referring now to FIG. 8, there is shown a block diagram of method 700 for defining servicing constraints. The first constraint for a servicing action is that a service area can only be serviced if it is scheduled after a deployment action at a node $d \in D_s$ or move action (block 702). Thus, there is the constraint $$\forall m \in A_S, \forall n \in A_T, \forall p \in P, \forall d \in D, \forall s \in S \; \overline{I}_{m,p,s}^{service}= 1 \Rightarrow \Sigma_{n \in A_T} \overline{I}_{mn,p-1,d}^{deploy} + \Sigma_{d' \in D} \overline{I}_{m,p-1,(d',d)}^{move}=1 \quad (27)$$

where $(d',d) \in \varepsilon$. Next, there is the constraint (block 704) that a service action can only be performed if it is scheduled while the agent is deployed $$\forall m \in A_S, \forall p \in P \; \Sigma_{s \in S} \overline{I}_{m,p,s}^{service}=1 \Rightarrow \overline{D}_{m,p}=0 \quad (28)$$

Additionally, every service goal, as constrained at block 400, should be completed exactly by the group of agents (block 706). Thus $$\forall s \in S \; \Sigma_{m \in A_S} \Sigma_{p \in P} \overline{I}_{m,p,s}^{service}=1. \quad (29)$$

Finally, referring back to FIG. 2, the cost function to be minimized in the initial formulation is to minimize the end time of the last phase over all agents (block 108). Tus, the objective is $$\text{minimize max}_{a \in A} \overline{T}_{a,P}^{end}. \quad (30)$$

The constraints and cost function described hereinbefore fully model the SATP and know MILP solvers can be employed in solving the SATP as currently formulated. However, the resulting search space may require excessive processing times to obtain solutions. In seeking methods to limit the search space required by MILP solvers, those of skill in the art of computational complexity theory can recognize that full optimization of the SATP is non-deterministic polynomial-time (NP) hard.

First, it can be shown that the SATP belongs to the class NP. First posed is the corresponding decision problem to the optimization problem constructed from constraints (2) to (29) and cost function (30) as a formal language.

$$\text{SATP}=\{(D,\varepsilon),c,S,M,N,l,f(\cdot),P,T'\} \quad (31)$$

f: D→S
T'∈ℝ
M service agents and N transport agents are assigned tasks during phases $\mathcal{P} = \{1, \ldots, P\}$ such that constraints (2)-(29) hold with $\max_{p \in P} \overline{T}_{a,P}^{end}$ of at most T'.

Next is considered a two-input, polynomial time algorithm $A(\cdot)$ that can verify SATP. One of the inputs to $A(\cdot)$ is an implementation of constraints (2)-(29). The other input is a binary assignment of the decision variables $\bar{I}_{a,p,l}^{k}$, $T_{a,p}^{start}$, $\bar{D}_{m,p}$, $\bar{F}_{m,p}$ and $T_{a,p}^{end}$. Algorithm A is constructed as follows: for each instantiation of the constraints, it is checked to see if the constraints hold in polynomial time.

For implementation of constraints (8), (16)-(29), they are first converted to a standard MILP implementation using techniques known to those of skill in the art. The conversion can also be done in polynomial time. The algorithm can then find the maximum value of $T_{a,p}^{end}$, and check to see if it is at most T'. As can be seen by those of skill in the art, this process certainly can be done in polynomial time.

It can be proven that SATP is NP-Complete by showing that it (1) belongs to NP, and (2) is polynomial-time reducible to another problem that is NP-Complete. As demonstrated hereinabove, the first criterion is satisfied. For the second criterion, the Traveling Salesman Problem (TSP) will be used. As known to those of skill in the art, the TSP has been shown to be NP-Complete. The following discussion will show that SATP$\leq_p$TSP. Let $$TSP = \{D_t, \varepsilon_t, c_t, T'\} \quad (32)$$

$c_t: \varepsilon \times \varepsilon \to \mathbb{R}$ $T' \in \mathbb{R}$ $(D_t, \varepsilon_t)$ has a tour of at most $T_t$.

First an algorithm, $f_t$:TSP→SATP, is constructed as follows. Since no restriction is made on node $d \in D_S$ being exclusive to service area $s \in S$ within SATP, the edges of $D_t$, D are assigned to map one-to-one to individual service areas, all service areas reachable by service agents and transport agents by all edges, and one of the service areas to serve as the origin node O. Thus, there are $S=|D_t|$ service areas in the SATP equivalent.

The standard TSP problem assumes a route for only one agent. Therefore all mappings of TSP are restricted to the case where N=M=1 within the new SATP problem. Likewise, the 'phases' within the TSP may be considered as equal to twice the number of vertices (one each for transit and service), plus two for docking and deployment of the single service agent by the single transport agent.

Thus, we have $P=|2D_t|+2$. For clarity, the now superfluous subscripts m and n are removed. Let $c^{dock}=c^{deploy}=c^{service}=0$. Let $c_{ij}^{move}=c_{ij}^{trans}$ for all $<i,j> \in \varepsilon$. These assignments can be done in polynomial time. It can now be shown that TSP has a solution of at most T' if and only if the mapped SATP has a solution of at most T' as well.

Suppose TSP has a solution of at most T'. The assignment of fuel costs to zero causes constraints (7)-(9) to become trivial, and the combination of $c^{dock}=c^{deploy}=0$ and $c_{ij}^{move}=c_{ij}^{trans}$ cause there to be no difference in servicing time between a service agent moving or being transported and deployed between service areas via (15).

The assignment $P=2|D_t|+2$ cause the only feasible schedules to be those involving an initial deployment of the single service agent, followed by a TSP tour of alternating service agent transits and servicing actions followed by a single docking, due to constraints (2)-(6) and (29). However, the equal transport/move cost and zero deck and deploy cost assignment causes (30) to degenerate into the simple tour cost of TSP.

Thus, the resulting SATP has a minimum time of at most T' as well. Next, suppose that SATP has a completion time at most T'. Then, since each service node must have been visited exactly once due to the choice of P, and all costs are zero with the exception of transit costs, the corresponding TSP problem has a tour cost of at most T' as well.

Figure 9:
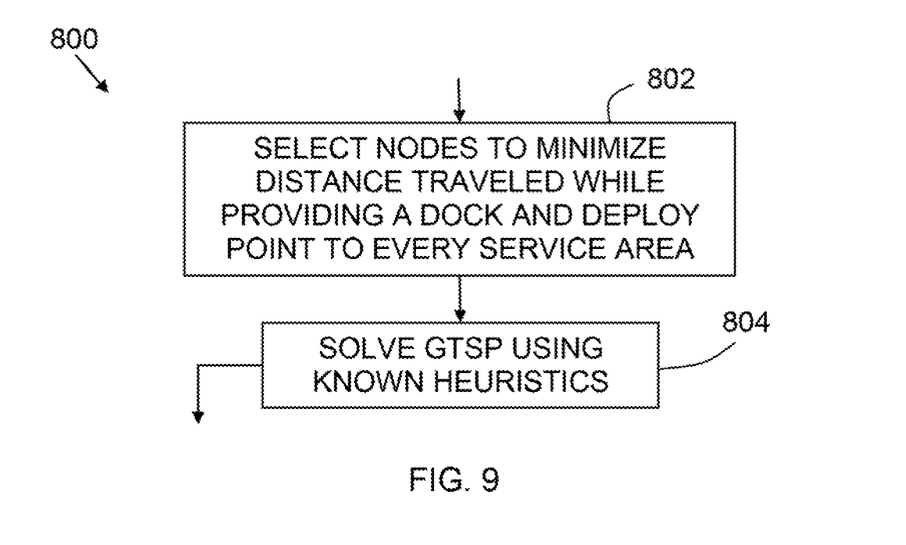
FIG. 9 illustrates a schematic block diagram of a method for a node reduction strategy.
Figure 10:
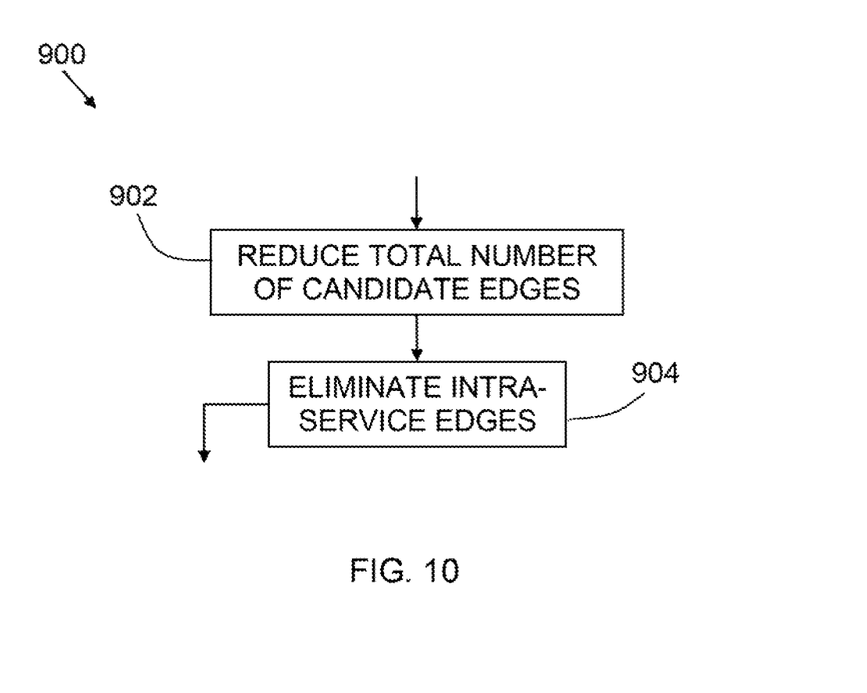
FIG. 10 illustrates a schematic block diagram of a method for an edge reduction strategy.

Two strategies can now be presented for increasing the tractability of the SATP by limiting the required number of variables needed in a particular SATP implementation, as indicated at block 110. The first strategy (block 800) reduces the number of candidate dock, deploy, and transit nodes to the closest S nodes that provide one node per service area. The second strategy (block 900) maintains the number of candidate nodes, but eliminates all transition edges between nodes within the same service area. Since the embedded routing problem significantly increases the complexity of a scheduling problem as a whole, the general idea of both reduction strategies is to decrease the routing problem in intelligent ways.

Referring now to FIG. 9, there is shown a block diagram of method 800 for a node reduction strategy. In method 800, the number of variables is attempted to be reduced by selecting only a subset of dock and deploy nodes for consideration in the overall optimization framework. Specifically, at block 802, the subset selected for consideration is the S nodes in a cluster that minimize the distance traveled to visit all nodes in the subset while providing a dock and deploy point to every service area S.

Formally, this node subset can be written as $$D' = \left\{ \operatorname*{argmin}_{D^*} \sum_{i,j \in D^*} c_{ij}^{move} \;\middle|\; i, j \in D^*, D^* \subset D, \forall s \in S, |D_S^*| = 1 \right\} \quad (33)$$

where $D^*_S$ is the set of nodes connected to service areas within the node subset $D^*$. Equation (33) represents a form of the generalized traveling salesman problem (GTSP), know to those of skill in the art. While the GTSP is another NP-hard problem, its use increases the tractability of the SATP in two ways. First, because the GTSP is partly encapsulated within the SATP when determining routes for the individual agents, solving the GTSP (block 804) before the main schedule optimization will eliminate orders of magnitude more permutations required in the overall optimization than required to solve the GTSP. Second, there are several heuristics know to those of skill in the art that can quickly provide efficient but sub-optimal solutions to the GTSP (block 112).

Referring now to FIG. 10, there is shown a block diagram of method 900 for an edge reduction strategy for reducing the scale of the SATP. The number of decision variables can be reduced by reducing the total number of candidate edges within the problem (block 902). As in the node reduction strategy, a balance needs to be maintained between reducing the scale of the problem and eliminating options for the agents to travel in order to transit in an efficient manner. An appropriate compromise between the two conflicting needs is in the elimination of intra-service area edges (block 904).

Specifically, we create a new edge map $V'$ as $$\varepsilon' = \{(i,j) \in \varepsilon \mid i \in D_{S_i}, j \in D_{S_j}, s_i \neq s_j\}. \quad (34)$$

The intuition behind using (34) is the assumption that there is little need for either a service agent or transport agent to transit between two nodes in a single service area, as once an area is serviced, the agents can simply choose the best route to the next service area. Thus, the SATP may be solved more efficiently by using method 900 to reduce candidate edges. Given the formulations described hereinabove, various algorithms are known to those of skill in the mixed-integer linear programming art for obtaining solutions to the SATP (also shown at block 112).

In an example of transit paths between four service areas consisting of four dock and deploy nodes per area, the edge reduction strategy was found to eliminate approximately 18% of the edges in the search space for agent movement. The node reduction strategy dramatically decreased the number of edges and nodes, reducing the number of edges to 8% of the full edge transit graph.

Figure 11:
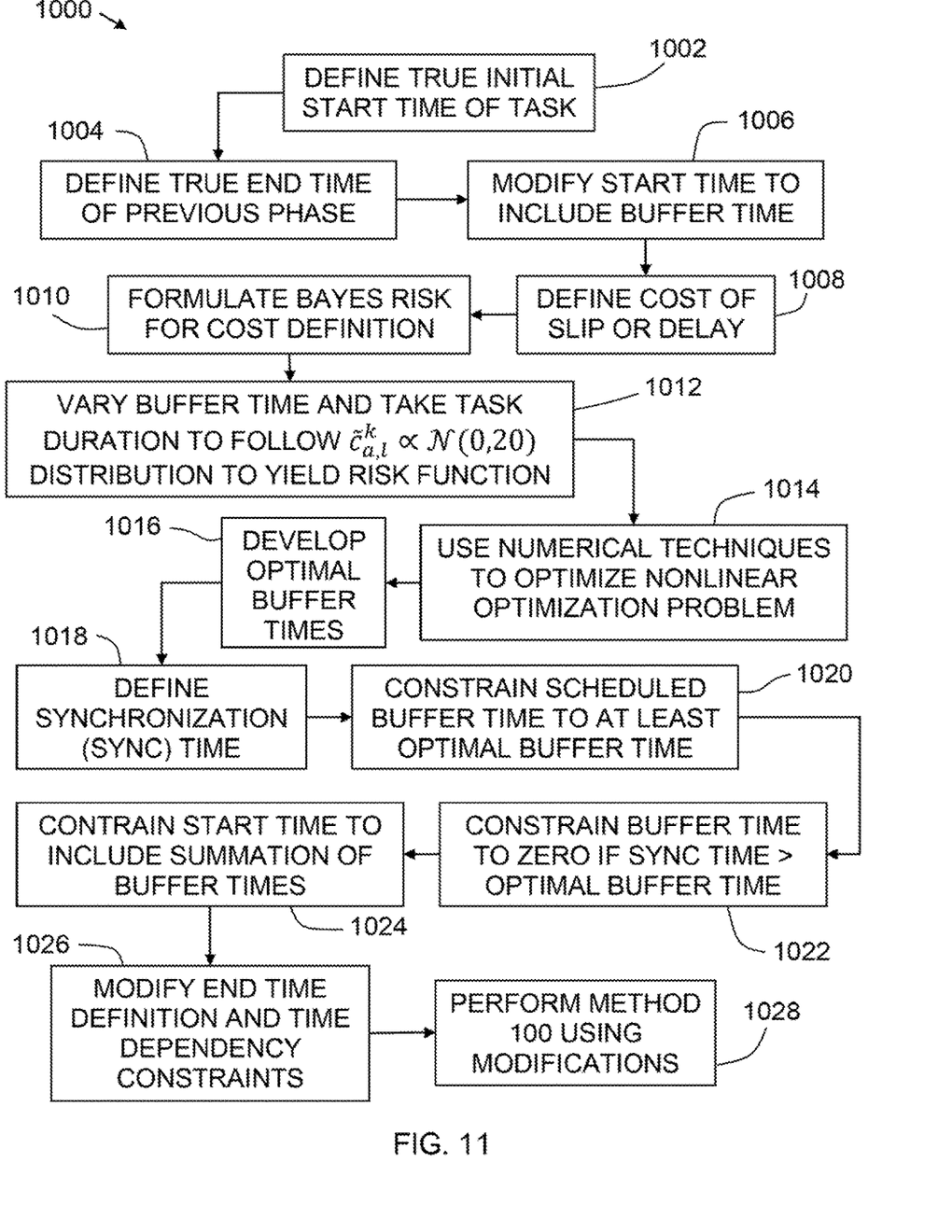
FIG. 11 illustrates a schematic block diagram of a method for incorporating uncertainty in the duration of tasks performed by agents.

Referring now to FIG. 11, there is shown a block diagram of method 1000 for extending the framework described hereinbefore to incorporate uncertainty in the duration of various tasks being performed by the individual agents. The methodology is based on the general idea that there is a significant potential cost of schedule slips. Specifically, a schedule slip is defined as when the end time of a task as scheduled exceeds the scheduled start time of the following task.

Often, schedule slips can have catastrophic consequences in real-world multi-agent systems. For example, an agent finishing a service task on time while a transport agent is significantly delayed could loiter in a dangerous location or potentially run out of fuel before docking could be performed. Similarly, a service agent being significantly delayed when expected to rendezvous with a transport agent could significantly delay the entire schedule for the remainder of the mission.

In order to develop a robust scheduling scheme to mitigate these hazards with the robust service agent transport problem (R-SATP) extension, the assumption is first made that for actions taken by the individual agents, no tasks can be performed before their scheduled start time. Formally, this can be done by creating a constraint defining the true initial start time of a task (block 1002) as $$T_{a,p}^{start} = \max\{T_{a,p-1}^{end}, T_{a,p}^{start}\}, \quad (35)$$

where $T_{a,p-1}^{end}$ is the true end time of the previous phase for agent a.

The true end time of the previous phase can then be defined (block 1004) as $$T_{a,p-1}^{end} = T_{a,p-1}^{start} + \Sigma_{k \in K}\Sigma_{l \in L_k}\tilde{c}_{a,p-1,l}^{k}\mathcal{T}_{a,p-1,l}^{k}, \quad (36)$$

where $\tilde{c}_{a,p,l}^{k}$ is the true duration of task k during phase p performed by agent a on location set l. The definition of $T_{a,p-1}^{start}$ from (14) can be modified (block 1006) to $$T_{a,p+1}^{start} = T_{a,p}^{start} + \Sigma_{k \in K}\Sigma_{l \in L_k}\tilde{c}_{a,l}^{k}\mathcal{T}_{a,p,l}^{k} + T_{a,p}^{buff}, \quad (37)$$

where $T_{a,p}^{buff}$ is a notational buffer time to prevent schedule slips that will be defined with optimization variables hereinafter.

Beforehand, the general strategy of focusing on minimizing schedule slips during individual phases will be characterized. This can be done with the following proposition, which shows that if a phase is currently in a schedule slip situation, there must have been a "root cause" phase in the past where the time required to perform a task in a phase p' must have exceeded the planned time. This can be done without loss of generality for the case where $T_{a,p}^{buff} = 0$. In this sense, minimizing the likelihood of schedule slip by creating a statistically optimal buffer time $T_{a,p}^{buff}$ is an appropriate strategy. We thus have the proposition $$\text{If } \tilde{T}_{a,p}^{start} = \tilde{T}_{a,p-1}^{end} \quad (38)$$

and $$\tilde{T}_{a,p}^{start} > \tilde{T}_{a,p-1}^{start} + \Sigma_{k \in K}\Sigma_{l \in L_k}c_{a,l}^{k}\mathcal{T}_{a,p-1,l}^{k}, \quad (39)$$

for some p>0, then there exists a p'≤p such that $$\Sigma_{k \in K}\Sigma_{l \in L_k}\tilde{c}_{a,p',l}^{k} > \Sigma_{k \in K}\Sigma_{l \in L_k}c_{a,l}^{k}. \quad (40)$$

The following proof is provided. Suppose (38) and (39) are true for some p>0. Since $$\tilde{T}_{a,p}^{start} = \tilde{T}_{a,p-1}^{end} \quad (41)$$

$$= \tilde{T}_{a,p-1}^{start} + \Sigma_{k \in K}\Sigma_{l \in L_k}\tilde{c}_{a,p-1,l}^{k}\mathcal{T}_{a,p-1,l}^{k}, \quad (42)$$

then (39) implies $$\tilde{T}_{a,p-1}^{start} + \Sigma_{k \in K}\Sigma_{l \in L_k}\tilde{c}_{a,p-1,l}^{k}\mathcal{T}_{a,p-1,l}^{k} > \Sigma_{k \in K}\Sigma_{l \in L_k}c_{a,l}^{k}\mathcal{T}_{a,p-1,l}^{k}. \quad (43)$$

There are now two cases for the value of $\tilde{T}_{a,p-1}^{start}$. In the first case, Case 1:

$$\tilde{T}_{a,p-1}^{start} = \tilde{T}_{a,p-1}^{start}. \quad (44)$$

If (44) holds, then from (43)

$$\Sigma_{k \in K}\Sigma_{l \in L_k}\tilde{c}_{a,p',l}^{k} > \Sigma_{k \in K}\Sigma_{l \in L_k}c_{a,l}^{k} \quad (45)$$

for p'=p-1, and the proposition holds in this case. If Case 1 does not hold, there is Case 2:

$$\tilde{T}_{a,p-1}^{start} = \tilde{T}_{a,p-2}^{end}. \quad (46)$$

Due to the definition of $\tilde{T}_{a,p}^{start}$ and (36), $$\tilde{T}_{a,p-1}^{start} = \tilde{T}_{a,p-2}^{end} \quad (47)$$

$$= \tilde{T}_{a,p-2}^{start} + \Sigma_{k \in K}\Sigma_{l \in L_k}\tilde{c}_{a,p-2,l}^{k}\mathcal{T}_{a,p-2,l}^{k}. \quad (48)$$

There are now three possibilities to the relation of $\tilde{T}_{a,p-1}^{start}$ to $T_{a,p-2}^{start} + \Sigma_{k \in K}\Sigma_{l \in L_k}c_{a,l}^{k}\mathcal{T}_{a,p-2,l}^{k}$:

$$\tilde{T}_{a,p-1}^{start} > T_{a,p-2}^{start} + \Sigma_{k \in K}\Sigma_{l \in L_k}c_{a,l}^{k}\mathcal{T}_{a,p-2,l}^{k} \quad (49)$$

$$\tilde{T}_{a,p-1}^{start} < T_{a,p-2}^{start} + \Sigma_{k \in K}\Sigma_{l \in L_k}c_{a,l}^{k}\mathcal{T}_{a,p-2,l}^{k} \quad (50)$$

$$\tilde{T}_{a,p-1}^{start} = T_{a,p-2}^{start} + \Sigma_{k \in K}\Sigma_{l \in L_k}c_{a,l}^{k}\mathcal{T}_{a,p-2,l}^{k} \quad (51)$$

However, if (50) or (51) hold, it would violate the assumption of being in Case 2. Combining (47) and (49)

$$\tilde{T}_{a,p-2}^{start} + \Sigma_{k \in K}\Sigma_{l \in L_k}\tilde{c}_{a,p-2,l}^{k}\mathcal{T}_{a,p-2,l}^{k} > T_{a,p-2}^{start} + \Sigma_{k \in K}\Sigma_{l \in L_k}c_{a,l}^{k}\mathcal{T}_{a,p-2,l}^{k} \quad (52)$$

results in the same assumptions as before for p-1. By induction, the same process is followed to p=1. From initial conditions, $$T_{a,0}^{start} = \tilde{T}_{a,0}^{start} = 0, \quad (53)$$

which implies $$\tilde{T}_{a,1}^{start} = 0 + \Sigma_{k \in K}\Sigma_{l \in L_k}\tilde{c}_{a,0,l}^{k}\mathcal{T}_{a,0,l}^{k} > \Sigma_{k \in K}\Sigma_{l \in L_k}c_{a,l}^{k}\mathcal{T}_{a,0,l}^{k}, \quad (54)$$

satisfying the proposition for p=1.

The foregoing proposition can be used as motivation to focus on treating the robustification of schedules as a Markov process. Because (40) holds if a schedule slip occurred according to the foregoing proposition the dominant factor in the probability of schedule slip in the current phase is the uncertainty in the action performed in the previous phase. As a result, the possibility of a schedule slip in the overall schedule is mitigated by reducing the possibility of a schedule slip in every phase. Using (35)-(37), the general strategy for reducing the risk of schedule slips can now be characterized.

It can be assumed there is a numerical cost (measured in time) to the occurrence of either a schedule slip, or a delay beyond the buffer time $$\Sigma_{k \in K}\Sigma_{l \in L_k}c_{a,l}^{k}\mathcal{T}_{a,p,l}^{k} > T^{buff} \Rightarrow c^{slip}$$

$$\Sigma_{k \in K}\Sigma_{l \in L_k}c_{a,l}^{k}\mathcal{T}_{a,p,l}^{k} < T^{buff} \Rightarrow c^{ineff}, \quad (55)$$

as indicated at block 1008.

Using a definition of Bayes risk known to those of skill in the art, the Bayes risk for the foregoing cost definition can be written (block 1010) as $$R = c^{ineff} P(\tilde{c}_{a,l}{}^k < T_{a,l}{}^{k,buff}) P^{ineff} + c^{slip} P(\tilde{c}_{a,l}{}^k > T_{a,l}{}^{k,buff}) P^{slip}, \quad (56)$$

for a particular action k, where $P^{ineff}$ and $P^{slip}$ are prior probabilities of adverse consequences of either a delay, or a schedule slip, respectively. Varying the buffer time and assuming the task duration follows a $\tilde{c}_{a,l}{}^k \propto N(0,20)$ distribution yields a risk function related to buffer time (block 1012). The risk function is invariant with respect to being performed during a particular phase p. As such, the nonlinear optimization problem can be optimized as $$T_{a,l}{}^{k,buff*} = \arg\min \ c^{ineff} P(\tilde{c}_{a,l}{}^k < T_{a,l}{}^{k,buff}) P^{ineff} + c^{slip} P(\tilde{c}_{a,l}{}^k > T_{a,l}{}^{k,buff}) P^{slip} T_{a,l}{}^{k,buff} \quad (57)$$

using numerical techniques prior to the schedule optimization (block 1014).

Once an optimal buffer time for every action, location and agent (type) is developed (block 1016), they can be treated as parameters in the R-SATP extension. If $P^{ineff}$ and $P^{slip}$ are treated as uniform priors, (57) may be re-written as $$T_{a,l}{}^{k,buff*} = \arg\min \ c^{ineff} P(\tilde{c}_{a,l}{}^k < T_{a,l}{}^{k,buff}) + c^{slip} P(\tilde{c}_{a,l}{}^k > T_{a,l}{}^{k,buff}) T_{a,l}{}^{k,buff} \quad (58)$$

Once the optimal buffer times for each individual task are found using (57), they may be factored into the overall optimization process. In order to incorporate the buffer time, advantage can be taken of the necessary delays between coordinated agent actions in the SATP by using the wait times as part of the required buffer times. Defining the synchronization time for agent a as the time difference between the end time of the current phase and the proceeding phase (block 1018), it is written $$T_{a,p}{}^{sync} = T_{a,p+1}{}^{start} - T_{a,p}{}^{end}. \quad (59)$$

It is then ensured at block 1020 that the decision variable representing the scheduled buffer time $T_{a,p}{}^{sync}$ is at least the desired, optimal buffer time $T_{a,l}{}^{k,buff}$ with the constraint $$I_{a,p,l}{}^k = 1 \wedge T_{a,p}{}^{sync} \leq T_{a,l}{}^{k,buff} \Rightarrow T_{a,p}{}^{buff} = T_{a,l}{}^{k,buff} - T_{a,p}{}^{sync}. \quad (60)$$

If the synchronization time is greater than the optimal buffer time parameter $T_{a,l}{}^{k,buff}$, then the buffer time is set to zero (block 1022) with the constraint $$I_{a,p,l}{}^k = 1 \wedge T_{a,p}{}^{sync} \geq T_{a,l}{}^{k,buff} \Rightarrow T_{a,p}{}^{buff} = 0. \quad (61)$$

Finally, the robust start time is set as the deterministic start time plus the summation of all buffer times (block 1024) with the constraint $$\forall a \in A, \forall p \in P \ \overline{T}_{a,p+1}{}^{start,R} = \overline{T}_{a,p+1}{}^{start} + \sum_{p' \in Ps.t.p' \leq p} \overline{T}_{a,p'}{}^{buff}. \quad (62)$$

In order to complete the robust scheduling extension, (15), (16) and (17) can be modified (block 1026) to use the new robust start times, creating the constraints $$\forall a \in A, \forall p \in P \ \overline{T}_{a,p}{}^{end} = \overline{T}_{a,p}{}^{start} + \sum_{k \in K} \sum_{l \in L_k} c_{a,l}{}^k \overline{I}_{a,p,l}{}^k \quad (63)$$

$$\forall m \in A_S, \forall m \in A_T, \forall p \in P \ \sum_{d \in D} \overline{I}_{mn,p,d}{}^{dock} = 1 \Rightarrow \overline{T}_{m,p}{}^{start} = \overline{T}_{n,p}{}^{start} \quad (64)$$

$$\forall m \in A_S, \forall m \in A_T, \forall p \in P \ \sum_{d \in D} \overline{I}_{mn,p,d}{}^{deploy} = 1 \Rightarrow \overline{T}_{m,p}{}^{end} = \overline{T}_{n,p}{}^{end}. \quad (65)$$

The above constraints are used in blocks 506 and 508 of method 500 (FIG. 6) in solving the SATP (block 1028).

What has thus been described is a formal framework for planning a schedule of service agent and transport agent actions. Within the SATP, autonomous service agents must perform tasks at a number of locations. The agents are free to move between locations. However, the agents may also be transported throughout the region by a limited number of faster-moving transport agents. The SATP, as resolved through method 100, results in all locations being serviced in the shortest amount of time. Method 1000 provides a robust extension of method 100 to account for schedule slippages.

Many modifications and variations of the present invention may become apparent in light of the above teachings. For example, the configuration of blocks in method 100 and method 1000 can be changed to suit the algorithms used in solving the SATP.

It will be understood that many additional changes in details, materials and arrangements of parts which have been described herein and illustrated in order to explain the nature of the invention, may be made by those skilled in the art within the principle and scope of the invention as expressed in the appended claims.

What is claimed is:

1. A method of optimizing task planning for a plurality of service agents and transport agents operating in a plurality of service areas, said method comprising the steps of:
   formulating said task planning as a sequence of said service agents and said transport agents tasks and start times during a plurality of phases such that all of said areas are serviced, fuel limitations are observed during each of said plurality of phases and each of said service agents is docked with one of said transport agents at an end of a last phase of said plurality of phases, such that an end time of said last phase over all said agents is minimized;
   constraining docking and deployment actions of said agents;
   constraining fuel availability, fuel costs and fuel capacity of said agents;
   constraining goals and capabilities of said agents;
   constraining time dependency and wait times of said agents;
   constraining transit and transport actions of said agents;
   constraining servicing actions of said agents;
   employing mixed-integer linear programming (MILP) techniques on a computer system to determine a task plan minimizing said end time based on said formulating and said constraining; and
   communicating said task plan from said computer to said agents for execution of said plan.

2. The method of claim 1, further comprising the step of limiting a search space required by said MILP techniques.

3. The method of claim 2, wherein said step of limiting a search space comprises the step of reducing candidate dock, deploy and transit nodes of said service areas to a set of closest nodes providing one node per each of said service areas.

4. The method of claim 3, wherein said step of limiting a search space further comprises:
   selecting a subset of nodes minimizing a distance traveled to visit each node in said subset;
   and providing a dock and deploy point to each said service area.

5. The method of claim 4, wherein said step of employing MILP techniques comprises the step of solving a generalized traveling salesman problem partly encapsulated within optimizing said task planning.

6. The method of claim 2, wherein said step of limiting a search space comprises the step of eliminating transition edges between nodes of said service areas within a same service area.

7. The method of claim 6, wherein said step of eliminating transition edges comprises the step of eliminating intra-service area edges.

8. The method of claim 1, wherein said step of constraining docking and deployment actions comprises the steps of:
constraining said service agents to completing certain of said tasks when said service agents are at least one of docked and deployed;
constraining said service agents to being docked prior to being deployed;
tracking if said service agents are one of docked and deployed; and
constraining a number of said service agents docked at a given time by each of said transport agents.

9. The method of claim 1, wherein said step of constraining goals and capabilities comprises the steps of:
constraining each of said agents to prosecuting a single one of said goals during one of said phases; and
constraining scheduling of said agents for completion of one of said tasks to those said agents capable of completing said one of said tasks.

10. The method of claim 1, wherein said step of constraining time dependency and wait times comprises the steps of:
constraining a start time of a first of said phases to equal zero;
constraining a start time of a next one of said phases to being at least as great as an end time of a previous one of said phases;
defining an end time of one of said phases to include a start time of said one of said phases plus a duration of one of said tasks performed by one of said agents at one of said service areas;
constraining docking and deployment actions of a pair of said service agents and said transport agents to occur at a same time for each of said pair; and
constraining one of said service agents from being in a wait state at a certain location when said one service agent is at least in one of a state of being otherwise tasked, of waiting at a location other than said certain location and of having performed an action at a different location than said certain location.

11. The method of claim 1, wherein said step of constraining transit and transport actions of said agents comprises the steps of:
constraining transit of said agents from a first location to a next location to those of said agents having performed an action at said first location;
constraining movement of said agents between service areas and servicing of one of said service areas to those of said agents deployed;
constraining agents to be docked with agents capable of capturing agents to those of such agents previously located at a location of said capturing; and
constraining deployment of agents to those of such agents previously located at a location of said deployment.

12. The method of claim 1, wherein said step of constraining servicing actions of said agents comprises the steps of:
constraining one of said servicing actions at one of said service areas to when said one of said servicing actions is scheduled after at least one of a deployment action at a node within said one of said service areas and a move action to said one of said service areas;
constraining performance of one of said servicing actions to when said one of said service actions is scheduled while an agent performing said one of said service actions is deployed;
constraining each of said agents to prosecuting a single one of said goals during one of said phases:
constraining scheduling of said agents for completion of one of said tasks to those said agents capable of completing said one of said tasks; and
completion of each of said goals by said agents scheduled for completion of said tasks.

13. The method of claim 1, wherein said step of constraining time dependency and wait times of said agents comprises the steps of:
constraining an initial start time of one of said tasks to at least one of a scheduled start time of said one of said tasks and an end time of a previous one of said tasks, wherein said end time is taken as a start time of said previous one of said tasks and a duration of said previous one of said tasks;
constraining a start time of a next one of said phases to being at least as great as said end time plus a buffer time;
defining costs for a schedule slip when said end time exceeds said duration plus said buffer time and for a delay when said end time is less than said duration plus said buffer time;
optimizing, for each of said tasks, said buffer time to minimize said costs for each of said tasks;
constraining a time difference between said end time and said start time of said next one of said phases to at least said buffer time;
constraining a robust start time to include said start time plus a summation of each said buffer time;
defining an end time of one of said phases to include said robust start time of said one of said phases plus a duration of one of said tasks performed by one of said agents at one of said service areas;
constraining docking and deployment actions of a pair of said service agents and said transport agents to occur at a same time for each of said pair; and
constraining one of said service agents from being in a wait state at a certain location when said one service agent is at least in one of a state of being otherwise tasked, of waiting at a location other than said certain location and of having performed an action at a different location than said certain location.

14. The method of claim 13, wherein said step of constraining docking and deployment actions comprises the steps of:
constraining said service agents to completing certain of said tasks when said service agents are at least one of docked and deployed;
constraining said service agents to being docked prior to being deployed;
tracking if said service agents are one of docked and deployed; and
constraining a number of said service agents docked at a given time by each of said transport agents.

15. The method of claim 14, wherein said step of constraining goals and capabilities comprises the steps of:
constraining each of said agents to prosecuting a single one of said goals during one of said phases; and constraining scheduling of said agents for completion of one of said tasks to those said agents capable of completing said one of said tasks.

16. The method of claim 15, wherein said step of constraining transit and transport actions of said agents comprises the steps of:
   constraining transit of said agents from a first location to a next location to those of said agents having performed an action at said first location;
   constraining movement of said agents between service areas and servicing of one of said service areas to those of said agents deployed;
   constraining agents to be docked with agents capable of capturing agents to those of such agents previously located at a location of said capturing; and
   constraining deployment of agents to those of such agents previously located at a location of said deployment.

17. The method of claim 16, wherein said step of constraining servicing actions of said agents comprises the steps of:
   constraining one of said servicing actions at one of said service areas to when said one of said servicing actions is scheduled after at least one of a deployment action at a node within said one of said service areas and a move action to said one of said service areas;
   constraining performance of one of said servicing actions to when said one of said service actions is scheduled while an agent performing said one of said service actions is deployed;
   constraining each of said agents to prosecuting a single one of said goals during one of said phases;
   constraining scheduling of said agents for completion of one of said tasks to those said agents capable of completing said one of said tasks; and
   completion of each of said goals by said agents scheduled for completion of said tasks.

18. The method of claim 17, further comprising the step of limiting a search space required by said MILP techniques.

19. The method of claim 18, wherein said step of limiting a search space comprises the steps of:
   reducing candidate dock, deploy and transit nodes of said service areas to a set of closest nodes providing one node per each of said service areas;
   selecting a subset of nodes minimizing a distance traveled to visit each node in said subset;
   providing a dock and deploy point to each said service area; and
   solving a generalized traveling salesman problem partly encapsulated within optimizing said task planning.

20. The method of claim 18, wherein said step of limiting a search space comprises the step of eliminating transition edges between nodes of said service areas within a same service area.

21. The method of claim 20, wherein said step of eliminating transition edges comprises the step of eliminating intra-service area edges.

* * * * *